US009293942B2

(12) United States Patent
Mercier et al.

(10) Patent No.: US 9,293,942 B2
(45) Date of Patent: Mar. 22, 2016

(54) MULTI-TAPPED INDUCTIVELY-COUPLED CHARGING SYSTEM

(71) Applicant: Massachusetts Institute of Technology, Cambridge, MA (US)

(72) Inventors: Patrick P. Mercier, San Diego, CA (US); Anantha P. Chandrakasan, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 278 days.

(21) Appl. No.: 13/891,003

(22) Filed: May 9, 2013

(65) Prior Publication Data

US 2013/0300357 A1 Nov. 14, 2013

Related U.S. Application Data

(60) Provisional application No. 61/645,104, filed on May 10, 2012.

(51) Int. Cl.
*H02J 7/00* (2006.01)
*H02J 7/02* (2006.01)

(52) U.S. Cl.
CPC ............... *H02J 7/025* (2013.01); *H02J 7/0052* (2013.01)

(58) Field of Classification Search
USPC .......................................................... 320/108
See application file for complete search history.

(56) References Cited

U.S. PATENT DOCUMENTS

2009/0243397 A1* 10/2009 Cook et al. .................... 307/104
2012/0112691 A1* 5/2012 Kurs et al. ..................... 320/108

* cited by examiner

*Primary Examiner* — Richard Isla Rodas
*Assistant Examiner* — David V Henze-Gongola
(74) *Attorney, Agent, or Firm* — Antony P. Ng; Russell Ng PLLC

(57) ABSTRACT

An apparatus for wirelessly charging an energy storage element is disclosed. The apparatus includes a coil, a set of capacitors, a set of switches and a rectifier. The coil, which has multiple taps, is capable of being energized by a charger via inductive coupling. The capacitors are connected to the coil at various taps. The switches selectively connect the rectifier to at least one of the capacitors to charge the energy storage element that is connected to the rectifier.

14 Claims, 2 Drawing Sheets

MULTI-TAPPED INDUCTIVELY-COUPLED CHARGING SYSTEM

PRIORITY CLAIM

The present application claims priority under 35 U.S.C. §119(e)(1) to provisional application No. 61/645,104 filed on May 10, 2012, the contents of which are incorporated herein by reference.

BACKGROUND OF THE INVENTION

1. Technical Field

The present invention relates to an apparatus for charging energy storage elements in general, and in particular to an apparatus for wirelessly charging energy storage elements within electronic devices.

2. Description of Related Art

Near-field inductive wireless power transfer is one method for chronically delivering power to electronic devices that are otherwise difficult to interface with using direct wired connections. Those electronic devices include implanted medical devices, radio frequency identification (RFID) products, non-contact semiconductor testers, etc.

Providing an energy storage element, such as a rechargeable battery, within the above-mentioned electronic device can be a favorable alternative to chronic wireless power delivery. For example, a patient implanted with a medical device will be benefited greatly from both aesthetic and usability perspectives if the implanted medical device has a built-in rechargeable battery that eliminates the need for a semi-permanent external power source because the patient can retain the functionalities of the implanted medical device even when the patient is performing tasks such as taking a shower or going for a swim, which are generally not conducive to wearing an external power source for delivering power to the implanted medical device. However, the size of a rechargeable battery within a medical implant device is somewhat limited, so charging must be performed frequently and the time to charge the rechargeable battery can be somewhat lengthy.

Consequently, it would be desirable to provide an improved apparatus for wirelessly charging an energy storage element located within electronic devices in a rapid manner.

SUMMARY OF THE INVENTION

In accordance with a preferred embodiment of the present invention, an apparatus for wirelessly charging an energy storage element includes a coil, a set of capacitors, a set of switches and a rectifier. The coil, which has multiple taps, is capable of being energized by a charger via inductive coupling. The capacitors are connected to the coil at various taps. The switches selectively connect the rectifier to at least one of the capacitors to charge the energy storage element that is connected to the rectifier.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

I. Inductive Coupling

Figure 1:
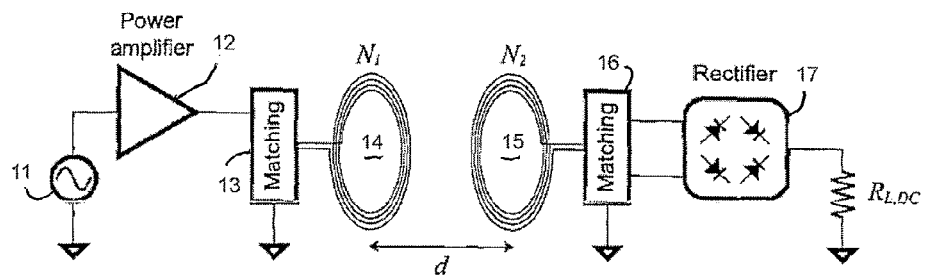
FIG. 1 is a schematic diagram of an inductive coupling system.

Referring now to the drawings, and in particular to FIG. 1, there is depicted a schematic diagram of an inductive coupling system. The inductive coupling system operates as follows. Along with a voltage source 11, a power amplifier 12 sends power via a matching network 13 to a primary-side coil 14 having $N_1$ turns. Matching network 13 is utilized to tune out the inherent loop inductance in order to decrease loading effects on power amplifier 12. So long as the operational wavelength is much less than the physical dimension of primary-side coil 14 and their separation, energy will be contained solely in near-field magnetics. In other words, primary-side coil 14 resembles an extreme electrically small antenna. As a result, a secondary-side coil 15 having $N_2$ turns, which is located at a distance d from primary-side coil 14, can receive AC energy from the time-varying magnetic field generated by primary-side coil 14. In turn, a matching network 16 then passes the radio-frequency (RF) output to a rectifier 17 that converts the AC energy into DC energy for powering a load resistor $R_{L,DC}$.

Figure 2:
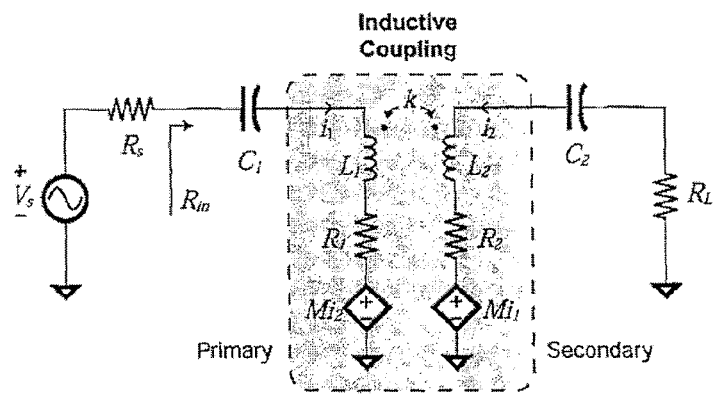
FIG. 2 is a circuit model of the inductive coupled system from FIG. 1.

A circuit model of the above-mentioned inductive coupling system is shown in FIG. 2. Inductors $L_1$ and $L_2$ model the reactances of coils 14 and 15, respectively. Inductors $L_1$ and $L_2$ are not perfect, however, as they both have finite quality factors Q. Specifically, the quality factor of each of coils 14 and 15 is given by $Q=\omega L/R$, where $\omega$ is the operating frequency and R is the parasitic series loss resistance. Current sources $Mi_2$ and $Mi_1$ model the mutual coupling effects between coils 14 and 15, where M is the mutual coupling factor. Capacitors $C_1$ and $C_2$ provide resonant matching with inductors $L_1$ and $L_2$, respectively. Coil coupling coefficient k is defined by the following equation:

$$k \equiv \frac{M}{\sqrt{L_1 L_2}} \quad (1)$$

Coil coupling coefficient k is dependent only on coil separation distance d and individual coil geometries. Importantly, k varies between 0 (no coupling) and 1 (perfect coupling), and decreases with d. Most transcutaneous medical implant devices have separation distances ranging from a few millimeters to 20 mm, resulting in $0.03<k<0.30$ for coils with centimeter-sized diameters.

Assuming perfect inductive coupling, the turns ratio of an ideal transformer is defined as:

$$n = \sqrt{\frac{L_1}{L_2}} \quad (2)$$

The primary side is driven by a voltage source $V_s$ that has a series resistance $R_s$. The secondary side is loaded by a resistor $R_L$. The actual load circuits are always found at the output of the rectifier. However, with respect to FIG. 1, $R_L \approx R_{L,DC}/2$.

Most wireless power transfer designs tend to focus on maximizing power transfer efficiency in order to minimize the size of an external power source such as a charger. Typically, power transfer efficiency can be maximized by resonating the inductors with capacitors.

The primary goal of the present invention, however, is not to maximize power transfer efficiency but to shorten charging time. From a design perspective, minimizing charging time is equivalent to maximizing the amount of power delivered to a load within a short period of time, given various source and system constraints. Thus, the technique of the present invention can be viewed as wireless energy transfer operating instantaneously at a maximum power transfer condition.

Figure 3:
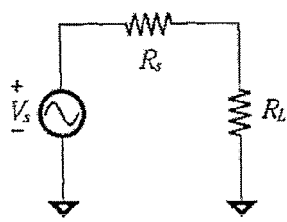
FIG. 3 is a resistive divider circuit.

In many cases, maximizing power transfer efficiency is not the same as maximizing power transfer to a load. To better understand this, consider the classic resistive divider circuit shown in FIG. 3. The power transfer efficiency of the resistive divider circuit shown in FIG. 3 is given by:

$$\eta = \frac{R_L}{R_L + R_s} \quad (3)$$

which is maximized when a load resistance $R_L$ is large relative to a source resistance $R_s$. However, the power delivered to the load is given by:

$$P_L = \frac{V_s^2 R_L}{(R_L + R_s)^2} \quad (4)$$

A large $R_L$ implies low current from a power source, which means low amounts of power are being delivered to the load. In the limit that $R_L$ tends to infinity, $\eta$ tends to 100%, yet $P_L$ tends to zero. The classic maximum power transfer theorem states that the load resistance should be matched to the source resistance in order to deliver the maximum amount of power possible to the load. In other words, $R_L = R_s$ for maximum power transfer. Naturally, if a circuit designer has the ability to make the source impedance arbitrarily small (as in many power amplifier designs), both high efficiency and high output power can be achieved from a given voltage source. Maximum power transfer still applies, but if the power source impedance can be made sufficiently low such that "enough" power is extracted from the power source, high efficiency can still be achieved at the desired output power.

In the case of inductively-coupled links, however, it is often not possible to change the impedance "seen" before the load due to finite coil quality factors. Therefore, given a fixed voltage source, it is relatively difficult to achieve both high efficiency and high power delivery at the same time.

A capacitor having an instantaneous resistance $R_C$ changes with its increasing output voltage is a problem when using an inductively-coupled charging system. Since there is an optimum impedance that maximizes power transfer to a load, there is at most only a single point in time during the capacitor charging interval at which it is charging at the maximum possible rate. In order to overcome this problem such that maximum power can be provided for larger portions of the charging time, one solution is to alter the effective load impedance using an additional matching network or an output DC/DC converter. However, given finite coil quality factors, it is difficult to achieve large impedance transformation ratios at high efficiencies.

The optimal impedance depends on the ratio of secondary reactances: $\sqrt{L_2/C_2}$. Under resonant conditions, $L_2$ and $C_2$ are naturally related as follow: $\omega_o = 1/\sqrt{L_2 C_2}$. Thus, the optimal impedance $R_{L,opt}$ for maximum power transfer can be rewritten in terms of either $L_2$ or $C_2$. The optimal impedance $R_{L,opt}$ for maximum power transfer written in terms of $L_2$ is as follows:

$$R_{L,opt} = \omega_o L_2 \left( \frac{1 + k^2 Q_1 Q_2}{Q_2} \right) \quad (5)$$

where k is the coil coupling coefficient, $\omega_o$ is the operating frequency, and $Q_1$ and $Q_2$ are the quality factors of respective coils.

Thus, for a given k, changing the value of $L_2$ (and correspondingly $C_2$) can change $R_{L,opt}$. Such a circuit can, at any point in time and for any k, change $R_{opt}$ to equal the charging capacitor's instantaneous resistance $R_C$ at that precise instance in time. This secondary reactance modulation technique can be performed dynamically to change load impedances instantaneously, or it can be performed semi-statically to provide robustness against variations in coil separation distances, all while decreasing charging time.

II. Multi-Tapped Inductively-Coupled Charging System

Figure 4:
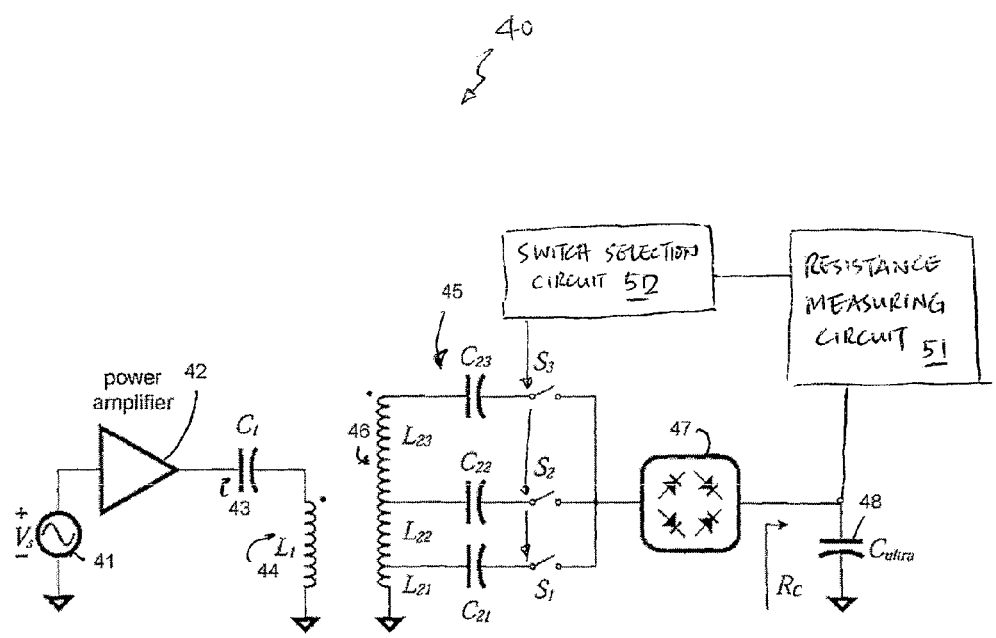
FIG. 4 is a schematic diagram of a multi-tapped inductively-coupled charging system, in accordance with a preferred embodiment of the present invention.

With reference now to FIG. 4, there is illustrated a schematic diagram of a multi-tapped inductively-coupled charging system, in accordance with a preferred embodiment of the present invention. As shown, a multi-tapped inductively-coupled charging system 40 includes a primary circuit and a secondary circuit. The primary circuit includes a voltage source 41, a power amplifier 42, a capacitor 43 and a coil 44. The secondary circuit includes a coil 46, a multi-tapped network 45, a rectifier 47 and a load 48. In addition, load 48 is connected to a resistance measuring circuit 51. Resistance measuring circuit 51 is coupled to a switch selection circuit 52 that is connected to multi-tapped network 45. Load 48 can be any rechargeable battery capable of being charged by charging system 40. For the present embodiment, load 48 is an ultra-capacitor $C_{ultra}$.

Multi-tapped network 45 includes capacitors $C_{21}, C_{22}, C_{23}$ and switches $S_1, S_2, S_3$. Coil 46 can be a single coil having an inductance $L_{23}$. The two smaller inductances, $L_{21}$ and $L_{22}$, can be formed by tapping into fewer turns of coil 46. Each tap on coil 46 is connected to a capacitor utilized to resonate with the effective inductance "seen" at the output of the tap. The output of each of capacitors $C_{21}, C_{22}, C_{23}$ is separately connected to one of switches $S_1, S_2, S_3$ for selecting a single tap configuration at a time. For the present embodiment, capacitor $C_{21}$ is connected to tap 1 of coil 46 and switch $S_1$, capacitor $C_{22}$ is connected to tap 2 of coil 46 and switch $S_2$, and capacitor $C_{23}$ is connected to tap 3 of coil 46 and switch $S_3$.

In order to have minimal effect on the coil quality factors, switches $S_1$-$S_3$ should be designed with as low on-resistance as possible. However, low-impedance switches typically have large associated parasitic capacitances. This problem is further complicated by the need for high voltage-blocking capabilities. In order to appreciate this problem, consider the following scenario: switch $S_1$ in on, and switches $S_2$ and $S_3$ are off. Inductor $L_{21}$ is resonating with capacitor $C_{21}$, and current is flowing through the rectifier, thereby charging $C_{ultra}$. Due to series resonance, the voltage at the node connecting $L_{21}$ and $C_{21}$ is Q multiplied. Since switches $S_2$ and $S_3$ are off, current in those branches are zero. As a result, the voltages at the inputs to $S_2$ and $S_3$ are at the same Q-multiplied level at the node connecting $L_{21}$ and $C_{21}$. Since intrinsic Qs can be relatively high (for example, upwards of 100), it appears to be a major problem. However, actual realized Qs are always much lower due to the loading effects of the rectifier and $R_C$. That being said, it is still important to maximize switch voltage-blocking capabilities for reliable operation.

Many inductively-coupled applications use class-E power amplifiers on the primary circuit for high efficiency. However, a class-E amplifier requires very precise knowledge of the load impedance in order to operate properly (and therefore at high efficiency). As previously discussed, inductive coupling systems operating with varying k and $R_C$ conditions can present wildly varying impedances as seen by the primary circuit, making the design of uncompensated class-E amplifiers impractical for these cases. Since class-D amplifiers can operate reasonably efficiently without significant regard for load impedances, a class-D amplifier is utilized as power amplifier 42 for the present embodiment. Rectifier 47 preferably includes four Schottky diodes connected in a bridge configuration.

During charging operation, the resistance of load 48 can be determined by resistance measuring circuit 51 at predetermined times (or continuously). The resistance information are then sent to switch selection circuit 52 to determine which one or more of switches $S_1$-$S_3$ within multi-tapped network 45 should be closed to select the appropriate inductance on coil 46 for maximum power transfer based on equation (5) for optimal impedance.

Alternatively, the determination of which one or more of switches $S_1$-$S_3$ should be utilized can be made by measuring the increase in voltage at load 48 for various switch combinations. Basically, the switch combination that yield the highest voltage change at load 48 is the switch combination for maximum power transfer.

As has been described, the present invention provides an apparatus for wirelessly charging energy storage elements in a rapid manner.

While the invention has been particularly shown and described with reference to a preferred embodiment, it will be understood by those skilled in the art that various changes in form and detail may be made therein without departing from the spirit and scope of the invention.

What is claimed is:

1. An apparatus for wirelessly charging an energy storage element, said apparatus comprising:
    a rectifier configured to connect to said energy storage element;
    a coil configured to be energized by a charger via inductive coupling, wherein said coil includes a plurality of taps for supplying various inductances;
    a first capacitors having only one terminal connected to said coil at a first one of said plurality of taps;
    a second capacitor having only one terminal connected to said coil at a second one of said plurality of taps;
    a first switch connected to another one terminal of said first capacitor;
    a second switch connected to another one terminal of said second capacitor;
    a resistance measuring circuit for measuring instantaneous resistance of said energy storage element;
    a switch selection circuit, connected to said resistance measuring circuit, for selectively closing one of said switches to connect said rectifier to one of said capacitors according to an instantaneous resistance measured by said resistance measuring circuit.

2. The apparatus of claim 1, wherein said apparatus further includes
    a third capacitor having only one terminal connected to said coil at a third one of said plurality of taps; and
    a third switch connected to another one terminal of said third capacitor.

3. The apparatus of claim 1, wherein said switches are opened when said energy storage element is not being charged.

4. The apparatus of claim 1, wherein said rectifier includes four diodes connected in a bridge configuration.

5. The apparatus of claim 1, wherein said energy storage element is a rechargeable battery.

6. The apparatus of claim 1, wherein said energy storage element is a capacitor.

7. The apparatus of claim 1, wherein said charger includes a charger coil, a power amplifier, and a power supply for energizing said charger coil via said power amplifier.

8. The apparatus of claim 7, wherein said power amplifier is a class-D amplifier.

9. A method for wirelessly charging an energy storage element, said method comprising:
    connecting a rectifier to said energy storage element;
    providing a coil to be energized by a charger via inductive coupling, wherein said coil includes a plurality of taps for supplying various inductances;
    connecting only one terminal of a first capacitor to said coil at a first one of said plurality of taps;
    connecting only one terminal of a second capacitor to said coil at a second one of said plurality of taps;
    measuring instantaneous resistance of said energy storage element; and
    selectively connecting said rectifier to one of said capacitors according to said measured instantaneous resistance for charging said energy storage element.

10. The method of claim 9, wherein said method further includes connecting only one terminal of a third capacitor to said coil at a third one of said plurality of taps.

11. The method of claim 9, wherein said energy storage element is a rechargeable battery.

12. The method of claim 9, wherein said energy storage element is a capacitor.

13. The method of claim 9, wherein said rectifier includes four diodes connected in a bridge configuration.

14. The method of claim 9, wherein said switches are opened when said energy storage element is not being charged.

* * * * *